United States Patent [19]

Appenzeller et al.

[11] 4,447,940
[45] May 15, 1984

[54] REVOLVING HOLLOW ROLL WITH A GAP SEAL

[75] Inventors: Valentin Appenzeller, Kempen; Peter F. Mingers, Willich-Anrath, both of Fed. Rep. of Germany

[73] Assignee: Eduard Küsters, Krefeld, Fed. Rep. of Germany

[21] Appl. No.: 329,007

[22] Filed: Dec. 9, 1981

[30] Foreign Application Priority Data

Jul. 16, 1981 [DE] Fed. Rep. of Germany ....... 3128140

[51] Int. Cl.³ .............................................. B21B 13/02
[52] U.S. Cl. .............................................. 29/116 AD
[58] Field of Search ........................ 241/293, 294, 295; 29/113 R, 116 R, 116 AD, 126; 308/20, 206, 207 R, 20 B

[56] References Cited

U.S. PATENT DOCUMENTS

| 3,097,022 | 7/1963 | Sernetz | 29/116 R |
| 3,803,682 | 4/1974 | Stein | 29/116 R |

FOREIGN PATENT DOCUMENTS 1193739 1/1966 Fed. Rep. of Germany.
2025777 6/1973 Fed. Rep. of Germany.
2718414 11/1978 Fed. Rep. of Germany.

OTHER PUBLICATIONS

"Melliand Textilberichte", 1972, pp. 935-940.

*Primary Examiner*—Mark Rosenbaum
*Attorney, Agent, or Firm*—Kenyon & Kenyon

[57] ABSTRACT

A roll with a revolving hollow roll and a stationary cross head which extends therethrough lengthwise, spaced a distance from the inside circumference of the hollow roll on all sides, has, in the space between the hollow roll and the cross head, a longitudinal chamber provided with a feed line for pressure liquid, divided by a sealing arrangement which comprises strip shaped longitudinal seals extending on both sides of the action plane of the roll, as well as transverse end seals. The transverse end seals are designed as gap seals, the gap surfaces of which are kept spaced from each other by separate precision antifriction bearings.

9 Claims, 4 Drawing Figures

U.S. Patent
May 15, 1984
4,447,940
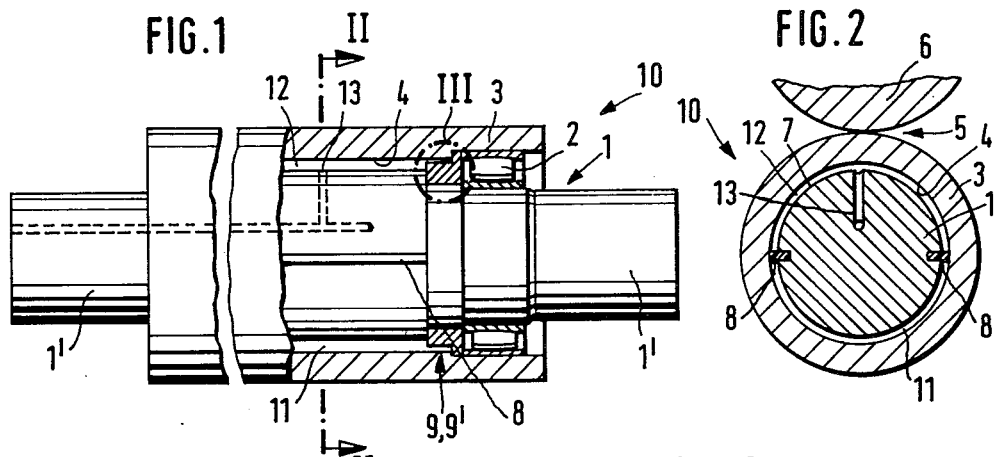
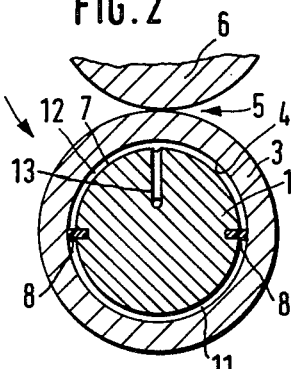
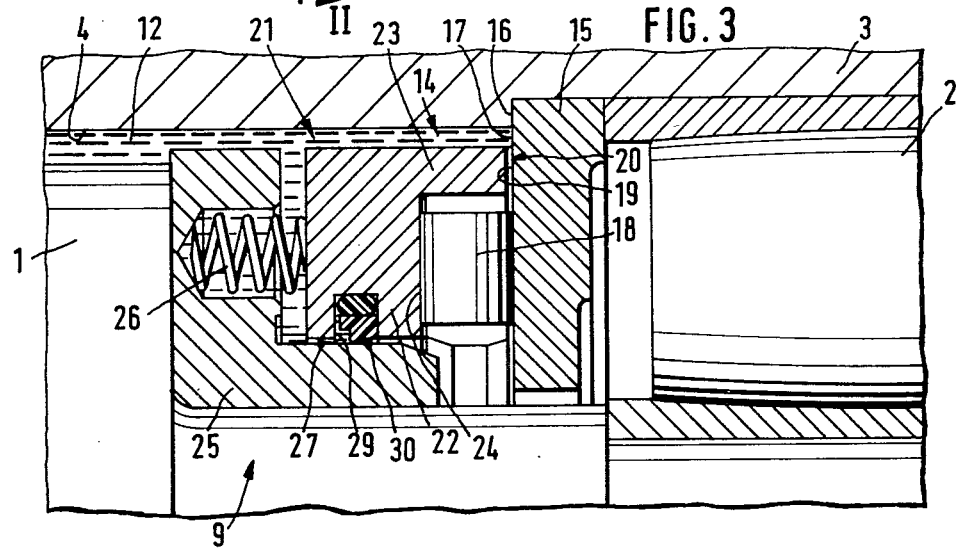
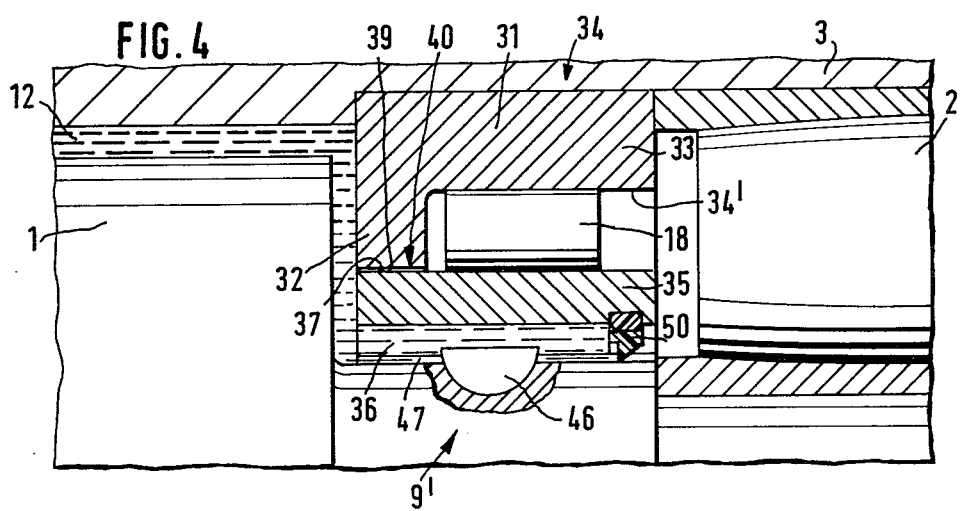

REVOLVING HOLLOW ROLL WITH A GAP SEAL

BACKGROUND OF THE INVENTION

This invention relates to a roll of the type having a hollow outer roll forming the working roll circumference braced against a cross head extending therethrough. The outer roll is braced against the inner roll by means of a pressure medium supplied by a feed line to a chamber formed between the outer roll and cross head by longitudinal and transverse seals. External forces may be applied to the ends of the cross head protruding from the hollow roll.

Rolls of this type in which the bracing of the outer roll against the cross head is by means of a pressure medium in a chamber formed therebetween, with different designs of the longitudinal and transverse end seal needed to seal off the chamber, are known from German Pat. Nos. 11 93 739, 20 25 777 and 27 18 414. There, the transverse end seals are designed as sliding ring seals or sliding strip seals which are connected to the cross head and rest against a radial flange connected to the revolving hollow roll. The pressure of the liquid in the chamber acts against the sliding strips, i.e., they make contact with the radial flange against the sliding surface with a force proportional to this pressure.

Long years of experience have shown that these rolls work satisfactorily as long as the pressure in the chamber is less than about 25 bar. For the use of such rolls in the paper, textile and plastic industry, this pressure is entirely sufficient.

If, however, the pressure in the chamber is increased beyond 25 bar, the friction of the seals at the counter surfaces increases so that appreciable power losses occur and, in addition, rapidly increasing wear is observed. This is of great concern particularly because rolls are basically continuously running elements and replacing a roll means considerable effort and in many cases a shutdown of an entire production line.

If, however, rolls of the type under discussion now are to be used for the processing of metals, higher pressures are required, which also necessitate higher pressures in the chamber.

While it is known in principle from the literature reference "Melliand Textilberichte" 8/53 (1972), pages 935 to 940, to also use so-called floating rolls of this general type in the steel industry, this requires special designs because of the higher pressures.

It is an object of the present invention to design a roll of the type described above, in such a way that no excessive friction losses and no wear occur at the transverse end seals even at higher pressures.

SUMMARY OF THE INVENTION

This problem is solved by a transverse end seal in the form of a gap seal with a separate precision bearing provided for keeping the surfaces of the gap seal spaced regardless of the flexing of the cross head and hollow roll.

By providing a gap seal, the friction problems accompanying the sliding seals customary heretofore and the wear and the losses resulting therefrom, are circumvented. However, this is not accomplished simply by providing a gap just somewhere in a roll of this type. Since the two parts of the roll which rotate with respect to each other and are to be sealed from one another, namely, the cross head and the hollow roll, are furthermore bent relative to each other during operation, it would be necessary to provide an ordinary gap seal with a considerable gap width in order to prevent contact under certain operating conditions. Such a gap, however, would not be capable of providing the necessary sealing at higher pressures, i.e., intolerably large leakage losses would result. For this reason, it is provided, according to the present invention, that the gap surfaces can be kept spaced by a separate precision roller bearing, and that this is achieved independently of possible bending of the cross head or the hollow roll. In this manner, a seal which retains its properties under all operating conditions and which can be provided with very small gap widths is provided.

Precision antifriction bearings with the dimensions of interest, the bearing races of which form the cooperating gap surfaces are commercially available. In extreme cases it is possible to keep the tolerance of the spacing of the gap surfaces, in the case of roller thrust bearings, in the range of 0.01 mm over their circumference. The associated bearing races are, of course, specially selected in such cases.

Thus, it is technically possible to make the spacing of the gap surfaces smaller than 0.1 mm. Depending on the diameter of the bearing, spacing values of 0.04 to 0.07 mm can be considered.

In a first embodiment of the present invention, the gap surfaces are plane and extend in the radial direction.

Axial compression springs may be used to ensure the correct position of the bearing races before the pressure in the chamber is built up.

In an alternative embodiment, the gap surfaces are cylindrical and the precision antifriction bearing is designed as a radial bearing.

BRIEF DESCRIPTION OF THE DRAWINGS

FIG. 1 shows a roll according to the present invention, partially in a longitudinally section.

FIG. 2 is a cross section according to line II—II in FIG. 1.

FIG. 3 is a detail from within the circle III in FIG. 1, enlarged.

FIG. 4 is a view corresponding to FIG. 3 of another embodiment of the present invention.

DETAILED DESCRIPTION

The roll 10 in FIG. 1 comprises a stationary cross head 1 and a hollow roll 3 which revolves around the cross head 1 and the inside circumference 4 of which is spaced a distance from the outside circumference of the cross head on all sides. The hollow roll 3 is supported on the cross head 1 in bearings 2 arranged near the ends. The ends 1' of the cross head 1 protrude from the hollow roll 3 and form the roll journals, at which forces can be applied to the roll 10 and by which they can be supported in a roll housing. A mating roll 6 makes contact with the roll from above in the embodiment shown and forms the roll gap 5 on its top side.

The space formed between the bearings 2, between the inside circumference 4 of the hollow roll 3 and the cross head 1, is divided into a chamber 12 located on the side of the roll gap 5, as well as into a chamber 11 located away from the roll gap 5, by longitudinal seals 8, which are arranged on both sides of the cross head 1 approximately at half the height thereof and rest against the inside circumference 4 of the hollow roll 3, as well as by transverse end seals which are arranged within the bearings 2 adjacent thereto. A feed line 13, by means of which pressure liquid can be fed into the chamber 12, leads into the chamber. This pressure liquid, on the one hand, acts against the inside circumference 4 of the hollow roll 3 and, on the other hand, against the surface 7 of the cross head 1 facing the former. Due to the spacing which is provided on all sides from the inside circumference of the hollow roll, the cross head 1 can bend under the action of the pressure in the chamber 12 required for developing the line pressure, without affecting the hollow roll 3. Also, because the hollow roll 3 is supported on the cross head 1 via the bearings 2, intentional bending of the hollow roll 3 can be brought about.

When the hollow roll 3 revolves, some leakage can always escape into the lower chamber 11 at the longitudinal seals 8, so that the lower chamber is gradually filled with pressure liquid. In certain cases, it may be desirable to also fill this chamber intentionally with pressure liquid at another pressure which is at a certain relationship to the pressure in the chamber 12. The lines required therefor are not shown for reasons of clarity.

The transverse end seal 9 can be seen in detail in FIG. 3. It comprises precision antifriction bearings 14, in the form of a thrust roller bearing, the one bearing race 15 of which is designed as a radial flange and is connected rigidily and tightly to the hollow roll 3. The bearing race 15 bears, on the one hand, against an internal shoulder 16 at the inside circumference 4 of the hollow roll, and on the other hand, against the bearing 2. The bearing race 15 has a plane running surface 17 for the bearing rollers 18 and forms, at the same time, one surface of the seal gap 20. The other surface 19 of gap 20 is provided at the other bearing race 21 which consists of a radial flange 22 and an axial shoulder 23, which is provided at the outer edge thereof, opposite the bearing race 15 and the end face of which, facing the bearing race 15, forms the other gap surface 19. The running surface 14 for the rollers 18 is provided by the lateral surface of the radial flange 22 facing the shoulder 23.

The bearing race 21 cooperates with a holding ring 25 which is of likewise angular cross section and is mounted firmly and tightly on the cross head on the inside of the bearing race 21 and carries axial pins, not shown, in its radial leg, the axial pins engage loosely with the bearing race 21 and prevent the bearing race 21 from rotating. In order to insure that the bearing race 21 makes contact with the rollers 18 and the other bearing race 15, respectively, even without pressure in the chamber 12, axially acting springs 26 are provided.

The bearing race 21 leaves a gap 27 from the radial leg of the holding ring 25, so that the axial leg of the holding ring 25 can move somewhat relative to the bearing race 21. In this region, a seal 30, which seals against the escape of pressure liquid from the chamber 12, is provided in a circular inside slot 29 of the radial flange 22. This seal need not take up rotation because parts 21 and 25 cannot rotate relative to each other. It must only be capable of managing the slight displacements of the parts 21 and 25 while preserving the sealing function. The rotary seal itself is accomplished at the gap 20, at which the gap surfaces 17 and 19 rotate relative to each other. Since these gap surfaces can be kept at a very small spacing of 0.4 to 0.07 mm, only a very small amount of pressure liquid passes, according to FIG. 3, from the top to the bottom along the gap 20, so that the pressure in the chamber 12 can be maintained with relatively little comsumption of pressure liquid. The passing small amount of pressure liquid serves only for lubricating the bearings 14 and 2. In principle, it would, of course, also be possible to arrange the axial shoulder 23 and the gap 20 radially within the rollers 18, but then the rollers would be located in the high pressure region, which is undesirable.

In FIG. 4, an alternative embodiment is shown, in which the transverse end seal 9' comprises a radial precision roller bearing 34. To the extent that in FIG. 4, the parts agree with the parts of the other figures, the same reference numerals are used.

The radial roller bearing 34 comprises an inner race 15, the cylindrical outside surface 37 of which forms a gap surface. The race 35 is separated from the cross head 1 by a narrow gap 47 and can therefore be displaced somewhat radially relative to the former, and can also be tilted slightly. The bearing race 35 is prevented from rotation by a key 46 which engages an inside axial slot 37 of the bearing race 35. The sealing against the pressure liquid present from the chamber 12 is accomplished by a circumferential seal 50.

The other bearing race 31 comprises a radial flange 32, the inside circumferential surface of which forms the other gap surface 39. An axial shoulder or flange 33 is arranged on the outside at the radial flange 32. The inside circumferential surface 34 of the flange 33 forms the other running surface for the rollers 18. The rollers 18 keep the gap surfaces 37 and 39 at the already mentioned small distance, which makes the development of a sealing gap 40 possible. Also in the embodiment according to FIG. 4, the rollers 18 are located outside the high pressure region.

What is claimed is:

1. In a roll with a revolving hollow roll forming the working roll circumference and a stationary cross head which extends through the hollow roll lengthwise spaced a distance from the inside circumference of the hollow roll on all sides, to which cross head external forces can be applied at the ends protruding from the hollow roll, the hollow roll braced against the cross head via a pressure liquid in a chamber which is formed in the space between the hollow roll and the cross head, said space provided with a feed line and divided by a sealing arrangement which is mounted at the cross head and comprises strip-shaped longitudinal seals extending along the cross head on both sides of the action plane of the roll, as well as transverse end seals provided at the ends of the chamber arranged opposite each other along the cross head and the hollow roll, the improvement comprising, each of the transverse end seals being in the form of a gap seal having opposed gap surfaces and a separate precision antifriction bearing for keeping the gap surfaces of said gap seal spaced regardless of flexure of the cross head and the hollow roll.

2. The improvement according to claim 1, wherein the spacing of said gap surfaces is smaller than 0.1 mm.

3. The improvement according to claim 1 wherein said gap surfaces are plane and extend radially, and said precision bearing comprises an axial precision roller bearing having one bearing race rotationally connected to the cross head, sealed to said cross head, but slightly axially and radially displacable, forming one gap surface and another bearing race firmly connected to the hollow roll and sealed to said hollow roll, forming the gap surface.

4. The improvement according to claim 3 wherein one of the bearing races comprise a radial flange which has an axial shoulder, the axial end face of which forms one gap surface and the lateral surface of which, facing the shoulder constitutes the running surface for the rolling body.

5. The improvement according to claim 4 wherein the axial shoulder and the gap surface, respectively, are arranged radially outside the rolling bodies.

6. The improvement according to claim 3 and further including axial compression springs, by means of which the bearing races are pressed together.

7. The improvement according to claim 1 wherein said gap surfaces are cylindrical and the transverse end seal comprises a radial precision antifriction bearing, having one bearing race which is rotationally connected to the cross head and sealed thereto but, slightly displaceable axially and radially, relative thereto, forming one gap surface, and another bearing race rigidly connected to the hollow roll and sealed thereto, forming the other gap surface.

8. The improvement according to claim 7 wherein one of the bearing races comprises a radial flange, the one circumferential surface of which forms the one gap surface and which carries an axial shoulder, of which the circumferential surface, facing the radial flange, forms a running surfaces for the rolling bodies.

9. The improvement according to claim 8, wherein the radial flange and the gap surface, respectively, are disposed axially within the rolling bodies.

* * * * *